United States Patent [19]

Yamada et al.

[11] Patent Number: 4,808,456
[45] Date of Patent: Feb. 28, 1989

[54] MAGNETO-OPTICAL RECORDING MEDIUM AND METHOD OF MAKING THE SAME

[75] Inventors: Takashi Yamada; Masaaki Nomura; Ryoichi Yamamoto; Akira Nahara, all of Odawara, Japan

[73] Assignee: Fuji Photo Film Co., Ltd., Kanagawa, Japan

[21] Appl. No.: 102,848

[22] Filed: Sep. 30, 1987

[30] Foreign Application Priority Data

Oct. 17, 1986 [JP] Japan .................. 61-247129

[51] Int. Cl.$^4$ ............................... G11B 7/24
[52] U.S. Cl. ....................... 428/65; 365/122; 369/13; 369/288; 427/127; 427/131; 427/132; 428/66; 428/694; 428/900
[58] Field of Search ........... 427/127, 131, 132; 428/694, 900, 65, 66; 369/13, 288; 365/122; 360/131, 134, 135

[56] References Cited

U.S. PATENT DOCUMENTS

| | | | |
|---|---|---|---|
| 4,435,801 | 3/1984 | Levin | 369/275 |
| 4,546,464 | 10/1985 | Inoue et al. | 427/240 X |
| 4,590,493 | 5/1986 | Inoue et al. | 428/913 X |
| 4,666,789 | 5/1987 | Gueugnon et al. | 428/900 X |

FOREIGN PATENT DOCUMENTS 161807 11/1985 European Pat. Off. .

Primary Examiner—Paul J. Thibodeau
Attorney, Agent, or Firm—Gerald J. Ferguson, Jr.

[57] ABSTRACT

A magneto-optical recording medium comprises a substrate, a magneto-optical recording layer formed of a rare earth metal-transition metal alloy and a dielectric protective layer overlaid in this order on the substrate, and a rare earth metal layer overlaid on an edge face of the magneto-optical recording layer. The magneto-optical recording medium wherein the substrate is annular is made by forming the magneto-optical recording layer, covering the recording region on the magneto-optical recording layer with an annular mask having an outer diameter not larger than the outer diameter of the magneto-optical recording layer and/or an inner diameter not smaller than the inner diameter of the magneto-optical recording layer, overlaying the rare earth metal layer on an outer edge face and/or an inner edge face of the magneto-optical recording layer by dispersing rare earth metal particles toward the annular mask, removing the annular mask, and overlaying the dielectric protective layer on the magneto-optical recording layer.

10 Claims, 1 Drawing Sheet

MAGNETO-OPTICAL RECORDING MEDIUM AND METHOD OF MAKING THE SAME

BACKGROUND OF THE INVENTION

1. Field of the Invention

This invention relates to a magneto-optical recording medium for use as a recording medium for quick information storage, image recording or the like, and a method of making the magneto-optical recording medium. This invention particularly relates to a magneto-optical recording medium in which a magneto-optical recording layer is protected from oxidation, and a method of making the magneto-optical recording medium.

2. Description of the Prior Art

Optical recording media have various advantages such as that they can record information at a high density, have a large capacity, and need not be contacted by a read/write head. Among such optical recording media, the magneto-optical recording medium has attracted particular attention for enabling easy erasing and rerecording.

The magneto-optical recording medium is composed of a magnetic material as a recording medium material, and records information based on changes in magnetization of the magnetic material. For example, an amorphous rare earth metal-transition metal alloy composed mainly of a combination of rare earth metal (RE) such as Gd, Tb or Dy with a transition metal such as Fe, Co or Ni is used as the magnetic material. The amorphous rare earth metal-transition metal alloy is used in a layer form as a magneto-optical recording layer.

The rare earth metal-transition metal alloy is readily oxidized. When the rare earth metal-transition metal alloy used as the magnetic material is oxidized, magnetic characteristics such as coercive force thereof deteriorate and efficient magneto-optical recording and reproduction may become impossible. Therefore, for practical use of the magneto-optical recording medium, it is necessary to prevent oxidation of the rare earth metal-transition metal alloy (i.e. the magneto-optical recording layer).

As disclosed in, for example, Japanese Unexamined Patent Publication No. 60(1985)-182535, in order to prevent oxidation of the magneto-optical recording layer, it has been proposed to cover the overall surface of the portion of the magneto-optical recording layer which contacts the ambient air with a protective layer formed of $SiO_2$ or $SiN_x$, where x designates a number within the range of 0.5 to 1.33. However, the effect of such a protective layer is merely to give the magneto-optical recording layer some degree of shielding from the ambient air by a substance which does not react with oxygen, and there is no positive effect of trapping oxygen. Therefore, with the proposed technique, it is not always possible to completely prevent the magneto-optical recording layer from oxidation. Particularly, the oxidation prevention effect is insufficient at the edge faces of the magneto-optical recording layer which are shielded from the ambient air only by a thin protective layer. Accordingly, oxidation progresses from the edge faces of the magneto-optical recording layer, and deterioration of the recording and reproduction characteristics, and deterioration of the appearance by cracking, pitting, corrosion, pinholes or the like occur.

Similar art of protecting the overall surface including the edge surface of the magneto-optical recording layer with a protective layer is disclosed in other Japanese patent and utility model publications such as Japanese Unexamined Patent Publication Nos. 57(1982)-27494, 58(1983)-60442, 60(1985)-182535, 60(1985)-258747, 62(1987)-40651, 62(1987)-164244, 62(1987)-167635, 62(1987)-167636, and Japanese Unexamined Utility Model Publication No. 62(1987)-113423.

SUMMARY OF THE INVENTION

The primary object of the present invention is to provide a magneto-optical recording medium in which oxidation from edge faces of the magneto-optical recording layer is prevented, and deterioration of recording and reproduction characteristics and deterioration of appearance are prevented.

Another object of the present invention is to provide a method of making the magneto-optical recording medium.

The present invention provides a magneto-optical recording medium comprising a substrate, and a magneto-optical recording layer formed of a rare earth metal-transition metal alloy and a dielectric protective layer which are overlaid in this order on the substrate, wherein the improvement comprises the provision of a rare earth metal layer overlaid on an edge face of said magneto-optical recording layer.

With the magneto-optical recording medium in accordance with the present invention, the layer of the rare earth metal, an active metal, is overlaid on the edge face of the magneto-optical recording layer, thereby to trap oxygen infiltrating from the exterior of the edge face of the magneto-optical recording layer, and to improve the effects on prevention of oxidation at the edge face from which the magneto-optical recording layer is readily oxidizable for structural reasons of the magneto-optical recording medium. Therefore, deterioration of the recording and reproduction characteristics, and deterioration of the appearance by cracking, pitting, corrosion, pinholes or the like can be prevented.

The term "magneto-optical recording medium" as used herein embraces recording media having an annular shape or any of various other shapes.

The term "provision of a rare earth metal layer overlaid on an edge face of said magneto-optical recording layer" as used herein embraces the case where the rare earth metal layer is overlaid over the overall area of the edge face or edge faces of the magneto-optical recording layer, and the case where the rare earth metal layer is overlaid over only a part of the overall area of the edge face or edge faces of the magneto-optical recording layer, for example, the case where the rare earth metal layer is overlaid on a part of the overall area of the edge face of the magneto-optical recording layer, or the case where the magneto-optical recording medium has an annular shape and the rare earth metal layer is overlaid only on one of the outer circumferential edge face and the inner circumferential edge face of the magneto-optical recording layer.

By the term "rare earth metal layer" as used herein is meant a layer containing a rare earth metal such as Gd, Tb, Dy or Ho.

The present invention also provides a method of making a magneto optical recording medium comprising an annular substrate, and a magneto-optical recording layer formed of a rare earth metal-transition metal alloy and a dielectric protective layer which are overlaid in this order on the substrate, the method of making a magneto-optical recording medium comprising the steps of:

(i) after the formation of said magneto-optical recording layer, disposing an annular mask having an outer diameter which is not smaller than the outer diameter of a recording region and is not larger than the outer diameter of said magneto-optical recording layer, or an annular mask having an inner diameter which is not larger than the inner diameter of said recording region and is not smaller than the inner diameter of said magneto-optical recording layer, on said magneto-optical recording layer so that a center of said annular mask approximately coincides with the center of said magneto-optical recording layer, (ii) overlaying a rare earth metal layer at least on an outer edge face or an inner edge face of said magneto-optical recording layer by dispersing particles containing a rare earth metal as a main constituent toward said annular mask, (iii) thereafter removing said annular mask from said magneto-optical recording layer, and (iv) overlaying said dielectric protective layer on said magneto-optical recording layer.

With the method of making a magneto-optical recording medium in accordance with the present invention, wherein the rare earth metal layer serving as an active metal layer for trapping oxygen infiltrating from the exterior is overlaid only on the edge face of the magneto-optical recording layer by disposing the annular mask on the magneto-optical recording layer in the course of the formation of the rare earth metal layer, the magneto-optical recording medium having the aforesaid effects can be made simply and quickly.

In the case where the magneto-optical recording layer is formed by a dual-simultaneous vacuum evaporation process or a dual-simultaneous sputtering process by use of two deposition material sources or two sputtering targets respectively containing a rare earth metal and a transition metal, the rare earth metal layer can be formed by carrying out vacuum evaporation or sputtering by use of only one of the deposition material sources or one of the sputtering targets that contains the rare earth metal and that was used for the formation of the magneto-optical recording layer. In this case, one of the deposition material sources or one of the sputtering targets used for the formation of the magneto-optical recording layer can be utilized also for the formation of the rare earth metal layer, and therefore the magneto-optical recording medium can be made efficiently and economically.

The term "magneto-optical recording medium" as used herein with reference to the method of making a magneto-optical recording medium in accordance with the present invention means a disk-shaped recording medium, i.e. an optical disk.

By the term "annular substrate" as used herein is meant a substrate on which the magneto-optical recording layer, the dielectric protective layer and other layers are to be overlaid. In the case where the annular substrate is to be disposed on the incidence side of recording and reproducing light, it should be permeable to light and formed of glass, PMMA, PC, an epoxy resin or the like.

The annular mask is used for preventing the rare earth metal from depositing on the recording region in the course of the formation of the rare earth metal layer, and may be formed of any suitable material. As mentioned above, the annular mask may be at least the one having an outer diameter which is not smaller than the outer diameter of the recording region and is not larger than the outer diameter of the magneto-optical recording layer, or at least the one having an inner diameter which is not larger than the inner diameter of the recording region and is not smaller than the inner diameter of the magneto-optical recording layer. The former annular mask is used in the case where the rare earth metal layer is to be overlaid at least on the outer edge face of the magneto-optical recording layer, and the latter annular mask is used in the case where the rare earth metal layer is to be overlaid at least on the inner edge face of the magneto-optical recording layer. Both the concept of the former annular mask and the concept of the latter annular mask embrace an annular mask having an outer diameter which is not smaller than the outer diameter of the recording region and is not larger than the outer diameter of the magneto-optical recording layer, and an inner diameter which is not larger than the inner diameter of the recording region and is not smaller than the inner diameter of the magneto-optical recording layer. The annular mask having the defined outer diameter and the defined inner diameter is used in the case where the rare earth metal layer is to be overlaid on both the outer and iner edge faces of the magneto-optical recording layer.

DESCRIPTION OF THE PREFERRED EMBODIMENTS

The present invention will hereinbelow be described in further detail with reference to the accompanying drawings.

Figure 1:
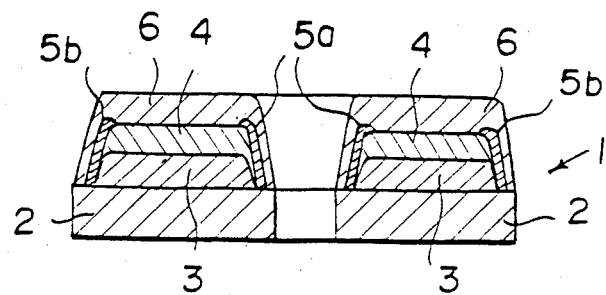
FIG. 1 is schematic sectional side view showing an embodiment of the magneto-optical recording medium in accordance with the present invention.

Referring to FIG. 1, a magneto-optical recording medium 1 comprises an annular non-magnetic transparent substrate 2 having a hole, into which a spindle shaft is to be inserted, at the center, and a first transparent dielectric protective layer 3 and a magneto-optical recording layer 4 which are overlaid on the transparent substrate 2. Rare earth metal layers 5a and 5b are formed over the overall areas of the inner and outer edge faces (inner and outer circumferential faces) of the first transparent dielectric protective layer 3 and the magneto-optical recording layer 4. Also, a second transparent dielectric protective layer 6 is formed such that it covers the first transparent dielectric protective layer 3, the magneto-optical recording layer 4, and the rare earth metal layers 5a and 5b.

As the material of the transparent substrate 2, glass, borosilicate glass, quartz, an epoxy resin, PC, PMMA or the like is used. The first transparent dielectric protective layer 3 and the second transparent dielectric protective layer 6 are formed of a material which does not react with oxygen, such as SiO, $SiO_2$, or $Si_3N_4$, and has the effect of preventing oxygen infiltration into the magneto-optical recording layer 4. The magneto-optical recording layer 4 is a magnetic layer capable of recording information through inversion of magnetization, and is formed of, for example, an amorphous rare earth metal-transition metal alloy such as GdTbFe, TbDyFe, GdFeCo or GdTbCo, so that the layer thickness is within the range of, for example, approximately 50 Å to approximately 3,000 Å.

As mentioned above, the magneto-optical recording layer 4 is readily oxidizable, and it has heretofore been proposed to prevent infiltration of oxygen by forming a dielectric protective layer over the overall surface of the magneto-optical recording layer 4. However, such a dielectric protective layer does not have the effect of positively trapping oxygen. Also, for reasons of the manufacturing process, the thickness of the dielectric protective layer is thin at the edge faces of the magneto-optical recording layer 4. Therefore, with the conventional technique, it is not always possible to completely prevent infiltration of oxygen from the edge faces of the magneto-optical recording layer 4. Accordingly, in the magneto-optical recording medium 1 in accordance with the present invention, the rare earth metal layers 5a and 5b which readily absorb oxygen are overlaid on the overall areas of the inner and outer edge faces of the magneto-optical recording layer 4, thereby to prevent oxidation of the magneto-optical recording layer 4 by trapping oxygen which cannot be shut out by the first transparent dielectric protective layer 3 and the second transparent dielectric protective layer 6 and which infiltrates from the edge faces of the magneto-optical recording medium 1. Therefore, with the magneto-optical recording medium 1 in accordance with the present invention, generation of cracking, pitting, corrosion, pinholes and other problems can be decreased markedly, and better recording and reproduction characteristics can be maintained as compared with the conventional magneto-optical recording medium.

In the embodiment shown in FIG. 1, the second transparent dielectric protective layer 6 is formed outward from the rare earth metal layers 5a and 5b. However, also in the case where the edge faces of the rare earth metal layers 5a and 5b are not covered by the second transparent dielectric protective layer 6 and only the rare earth metal layers 5a and 5b are overlaid on the edge faces of the magneto-optical recording layer 4, since the rare earth metal layers 5a and 5b have the effect of trapping oxygen, oxidation of the magneto-optical recording layer 4 can be prevented more efficiently than when, as in the conventional magneto-optical recording medium, the edge faces of the magneto-optical recording layer 4 are covered only by the dielectric protective layer having no effect of trapping oxygen.

Figure 2A:
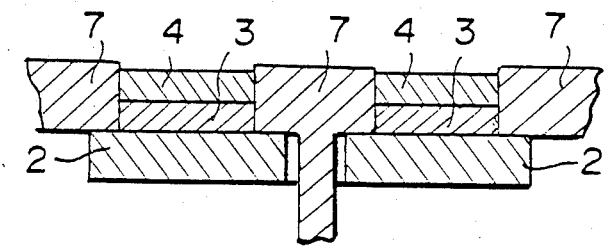
FIGS. 2A, 2B and 2C are schematic sectional side views showing an embodiment of the method of making a magneto-optical recording medium in accordance with the present invention.
Figure 2B:
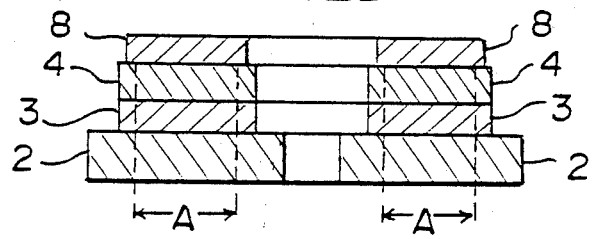
Figure 2C:
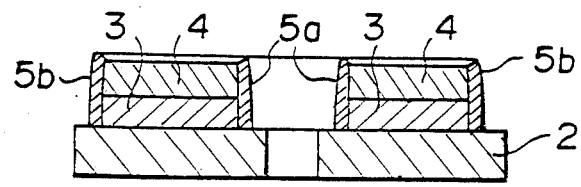

An embodiment of the method of making a magneto-optical recording medium in accordance with the present invention will hereinbelow be described with reference to FIGS. 2A, 2B and 2C. First, as shown in FIG. 2A, a first mask 7 is disposed on the transparent substrate 2, and the first transparent dielectric protective layer 3 and the magneto-optical recording layer 4 are overlaid on the substrate 2 concentrically therewith by vacuum evaporation or sputtering. At this time, the magneto-optical recording layer 4 is formed by a dual-simultaneous vacuum evaporation process or a dual-simultaneous sputtering process by use of two deposition material sources or two sputtering targets respectively containing a rare earth metal and a transition metal. Thereafter, the first mask 7 is removed from the substrate 2, and a second mask 8 is disposed on the magneto-optical recording layer 4 as shown in FIG. 2B. The second mask 8 has an outer diameter which is not larger than the outer diameter of the magneto-optical recording layer 4 and an inner diameter which is not smaller than the inner diameter of the magneto-optical recording layer 4, so that the second mask 8 covers the overall area of a recording region A on the magneto-optical recording layer 4. The second mask 8 is held by an appropriate holding member (not shown) so that the center of the second mask 8 approximately coincides with the center of the magneto-optical recording layer 4. After the second mask 8 is held on the magneto-optical recording layer 4 in this manner, rare earth metal particles are dispersed toward the second mask 8 by vacuum evaporation or sputtering. In this manner, as shown in FIG. 2C, the rare earth metal layers 5a and 5b are overlaid on the overall areas of the inner edge faces and the outer edge faces of the first transparent dielectric protective layer 3 and the magneto-optical recording layer 4. The formation of the rare earth metal layers 5a and 5b is carried out by use of the deposition material source or the sputtering target which contains the rare earth metal and which was used for the formation of the magneto-optical recording layer 4. Then, the second mask 8 is removed, and the second transparent dielectric protective layer 6 is formed so that it covers the first transparent dielectric protective layer 3, the magneto-optical recording layer 4, and the rare earth metal layers 5a and 5b as shown in FIG. 1. With this embodiment wherein the rare earth metal layers 5a and 5b are formed by use of the deposition material source or the sputtering target which contains the rare earth metal and which was used for the formation of the magneto-optical recording layer 4, the magneto-optical recording medium 1 can be made efficiently and economically.

In the aforesaid embodiments of the magneto-optical recording medium and the method of making the magneto-optical recording medium, the rare earth metal layers 5a and 5b are overlaid on the edge faces of the magneto-optical recording layer 4 and on the edge faces of the first transparent dielectric protective layer 3. However, the rare earth metal layers 5a and 5b may be formed only on the edge faces of the magneto-optical recording layer 4.

Also, in the aforesaid embodiments, the magneto-optical recording layer 4 is formed by use of a deposition material source or a sputtering target containing the rare earth metal and a deposition material source or a sputtering target containing the transition metal, and the rare earth metal layers 5a and 5b are formed by use of a deposition material source or a sputtering target containing the rare earth metal used for the formation of the magneto-optical recording layer 4. However, the formation of the magneto-optical recording layer 4 and the formation of the rare earth metal layers 5a and 5b may be carried out by use of any other method. For example, the magneto-optical recording layer 4 may be formed by use of the deposition material sources or the sputtering targets for the formation of the rare earth metal-transition metal alloy layer, and the rare earth metal layers 5a and 5b may be formed by use of an independent deposition material source or an independent sputtering target which contains the rare earth metal and which is different from the one used for the formation of the magneto-optical recording layer 4.

Also, in the present invention, the magneto-optical recording medium need not necessarily be provided with the first transparent dielectric protective layer 3 as the base layer.

We claim:

1. A magneto-optical recording medium comprising a substrate, and a magneto-optical recording layer formed of a rare earth metal-transition metal alloy and a dielectric protective layer which are overlaid in this order on the substrate, wherein the improvement comprises the provisions of a rare earth metal layer overlaid substantially only on at least one edge face of said magneto-optical recording layer, said edge face being substantially parallel to the thickness direction of the recording layer.

2. A magneto-optical recording medium as defined in claim 1 wherein said dielectric protective layer is overlaid to cover also said rare earth metal layer.

3. A magneto-optical recording medium as defined in claim 1 wherein another dielectric protective layer is formed between said substrate and said magneto-optical recording layer.

4. A magneto-optical recording medium as defined in claim 1 wherein said magneto-optical recording medium has an annular shape, and said rare earth metal layer is overlaid substantially only on (a) an inner edge face and (b) an outer edge face of said magneto-optical recording layer, said inner and outer edge faces being substantially parallel to the thickness direction of the recording layer.

5. A method of making a magneto-optical recording medium comprising an annular substrate, and a magneto-optical recording layer formed of a rare earth metal-transition metal alloy and a dielectric protective layer which are overlaid in this order on the substrate, the method of making a magneto-optical recording medium comprising the steps of:

(i) after the formation of said magneto-optical recording layer, disposing an annular mask having an outer diameter which is not smaller than the outer diameter of a recording region and is not larger than the outer diameter of said magneto-optical recording layer, or an annular mask having an inner diameter which is not larger than the inner diameter of said recording region and is not smaller than the inner diameter of said magneto-optical recording layer, on said magneto-optical recording layer so that a center of said annular mask approximately coincides with the center of said magneto-optical recording layer, (ii) overlaying a rare earth metal layer at least on an outer edge face or an inner edge face of said magneto-optical recording layer by dispersing particles containing a rare earth metal as a main constituent toward said annular mask, (iii) thereafter removing said annular mask from said magneto-optical recording layer, and (iv) overlaying said dielectric protective layer on said magneto-optical recording layer.

6. A method as defined in claim 5 wherein said annular mask has an outer diameter which is not smaller than the outer diameter of said recording region and is not larger than the outer diameter of said magneto-optical recording layer, and an inner diameter which is not larger than the inner diameter of said recording region and is not smaller than the inner diameter of said magneto-optical recording layer.

7. A method as defined in claim 5 wherein said magneto-optical recording layer is formed by a dual-simultaneous vacuum evaporation process or a dual-simultaneous sputtering process by use of two deposition material sources or two sputtering targets respectively containing a rare earth metal and a transition metal.

8. A method as defined in claim 7 wherein said rare earth metal layer is formed by carrying out vacuum evaporation or sputtering by use of one of said two deposition material sources or one of said two sputtering targets that contains the rare earth metal and that was used for the formation of said magneto-optical recording layer.

9. A method as defined in claim 5 wherein said dielectric protective layer is overlaid to cover also said rare earth metal layer.

10. A method as defined in claim 5 wherein another dielectric protective layer is formed between said annular substrate and said magneto-optical recording layer.

* * * * *